(12) United States Patent
Suzuki et al.

(10) Patent No.: US 7,813,090 B2
(45) Date of Patent: Oct. 12, 2010

(54) DC SWITCHGEAR PROVIDED WITH A COMMUTATION-TYPE DC CIRCUIT BREAKER

(75) Inventors: Masato Suzuki, Hitachi (JP); Yoshihiko Matsuda, Hitachiota (JP); Naoki Kawamura, Hitachinaka (JP); Masaru Haga, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 250 days.

(21) Appl. No.: 12/019,337

(22) Filed: Jan. 24, 2008

(65) Prior Publication Data
US 2008/0259531 A1    Oct. 23, 2008

(30) Foreign Application Priority Data
Feb. 8, 2007    (JP)    ............................... 2007-028889

(51) Int. Cl.
*H02H 7/04* (2006.01)
*H02H 7/85* (2006.01)
(52) U.S. Cl. ............................ 361/35; 361/93.9; 361/41
(58) Field of Classification Search .................. 361/11, 361/13, 35, 93.9, 41
See application file for complete search history.

(56) References Cited
U.S. PATENT DOCUMENTS

| | | | |
|---|---|---|---|
| 4,300,181 A | * | 11/1981 | Premerlani ..................... 361/4 |
| 4,751,606 A | * | 6/1988 | Matsko et al. ............... 361/93.2 |
| 5,484,972 A | * | 1/1996 | Tecchio ........................ 218/70 |
| 7,030,769 B2 | * | 4/2006 | Miller ......................... 340/635 |

FOREIGN PATENT DOCUMENTS

JP    2000-050431    2/2000

\* cited by examiner

*Primary Examiner*—Stephen W Jackson
*Assistant Examiner*—Zeev Kitov
(74) *Attorney, Agent, or Firm*—Mattingly & Malur, P.C.

(57) ABSTRACT

A DC switchgear is provided with a commutation-type DC circuit breaker having a main circuit provided with a main switch for interconnecting a DC power supply and a load, and a commutating circuit provided with a commutating capacitor and a commutating switch, which is connected electrically parallel to the main switch. The switchgear further has a DC circuit breaker accommodating box that includes the main circuit provided with the main switch, and the commutation-type DC circuit breaker; a front accommodating box disposed on the front of the DC circuit breaker accommodating box, which accommodates devices having functions for controlling the switchgear and indicating a status, such as a failure status thereof; and a rear accommodating box disposed on the back of the DC circuit breaker accommodating box. The front and rear accommodating boxes are connected to the DC circuit breaker accommodating box to form an integrated DC switchgear.

2 Claims, 3 Drawing Sheets

DC SWITCHGEAR PROVIDED WITH A COMMUTATION-TYPE DC CIRCUIT BREAKER

CLAIM OF PRIORITY

The present application claims priority from Japanese application serial No. 2007-028889, filed on Feb. 8, 2007, the content of which is hereby incorporated by reference into this application.

BACKGROUND OF THE INVENTION

1. Field of the Invention

The present invention relates to a DC switchgear and, more particularly, to a DC switchgear provided with a commutation-type DC circuit breaker.

2. Description of Related Art

The DC switchgear according to the present invention has a commutation-type DC circuit breaker.

Devices constituting a DC switchgear including a commutation-type DC circuit breaker are all disposed in a single common accommodating box in which the DC switchgear is accommodated. Japanese Patent Application Laid-open Publication No. 2000-50431 discloses an exemplary structure of a DC switchgear in which various types of devices are accommodated in an accommodating box.

For the DC switchgear disclosed in the Japanese Patent Application Laid-open Publication No. 2000-50431, for example, the devices disclosed as being accommodated in a single common accommodating box include a main switch, disposed at the bottom of the front inside the common accommodating box, which can be brought into and taken out of it, a non-linear resistor disposed behind the main switch, a commutating capacitor disposed above the non-linear resistor, control devices disposed in front of the commutating capacitor to control and operate various types of devices, a bus bar and connection conductors disposed in the internal space of the accommodating box, and an overcurrent detection relay attached to the bus bar.

The commutation-type DC circuit breaker having the above components is structured so that when an excessive current flows in a main circuit having the main switch and the like, a commutating switch is turned on after the main switch opens so as to supply a high-frequency AC current, that is, oscillating commutation current, involved in a discharge from the commutating capacitor. Therefore, the oscillating commutation current is superimposed on a main circuit current flowing in the main circuit and thereby a current zero is generated shutting off the excessive main circuit current.

In addition to the commutation-type DC circuit breaker, which opens and closes the main circuit, the DC switchgear has, in the common accommodating box, a disconnector for disconnecting the main circuit, a current transformer and voltage transformer for measuring and controlling electric power supplied to an external load, a protective relay for protecting the circuit, an auxiliary relay and switches for controlling the switchgear, and lamps and a failure indicator for indicating the status of the circuit breaker, a failure status, and the like.

As described above, conventional DC switchgears are structured in such a way that their all constituting devices are accommodated in a single common accommodating box.

However, the types, structures, and placements of the devices that constitute a DC switchgear and are accommodated on a per-switchgear basis vary depending on the application, specifications, and the like of the DC switchgear.

Patent Document 1: Japanese Patent Application Laid-open Publication No. 2000-50431

SUMMARY OF THE INVENTION

However, although the types, structures, and placements of the devices constituting a DC switchgear having an arrangement as disclosed in Japanese Patent Application Laid-open Publication No. 2000-50431 vary depending on the application, specifications, and the like of the each DC switchgear, all the devices constituting the DC switchgear are accommodated in a single common accommodating box. Therefore, all DC switchgear constituting devices must be designed individually for each DC switchgear.

Since the structures of the devices accommodated in the accommodating box vary depending on the each DC switchgear, as described above, when DC switchgears are manufactured, manufacturing procedures cannot be standardized. Accordingly, labor hours and time are taken to manufacture DC switchgears, making them expensive.

The purpose of the present invention is to provide a DC switchgear provided with a commutating DC circuit breaker for which labor hours and time taken to design and manufacture a DC switchgear suitable for various applications and specifications can be reduced by standardizing the design of a DC circuit breaker accommodating box.

The inventive DC switchgear provided with a commutation-type DC circuit breaker having a main circuit provided with a main switch for interconnecting a DC power supply and a load and for enabling and disabling a main circuit current flow, and a commutating circuit provided with a commutating capacitor and a commutating switch, which is connected electrically parallel to the main switch, comprising: a DC circuit breaker accommodating box includes, as a standard arrangement, the main circuit provided with the main switch, and the commutation-type DC circuit breaker having the commutating circuit provided with the commutating capacitor and the commutating switch, which are connected electrically parallel to the main switch; a front accommodating box disposed on the front of the DC circuit breaker accommodating box, which accommodates devices having functions for controlling the switchgear and indicating a status of the switchgear including a failure status thereof; and a rear accommodating box disposed on the back of the DC circuit breaker accommodating box, which accommodates a device for monitoring a status of the main circuit and protecting the main circuit; wherein the front accommodating box and the rear accommodating box are connected to the DC circuit breaker accommodating box to form an integrated DC switchgear.

Alternatively, the inventive DC switchgear provided with a commutation-type DC circuit breaker having a main circuit provided with a main switch for interconnecting a DC power supply and a load and for enabling and disabling a main circuit current flow, and a commutating circuit provided with a commutating capacitor and a commutating switch, which are connected electrically parallel to the main switch, comprising: a DC circuit breaker accommodating box includes, as a standard device arrangement, a movable main switch driving device having the main switch and the commuting switch, a non-linear resistor and a saturable reactor disposed behind the main switch driving device, the commutating capacitor disposed above the non-linear resistor, control devices for controlling and operating disposed devices, a bus bar and a connection conductor connected to the bus bar, an isolating point linked to the main switch, the commutating switch, the bus bar, and the connection conductor, and an overcurrent detection relay attached to the connection conductor flowing a main circuit current; a front accommodating box disposed on the front of the DC circuit breaker accommodating box, which accommodates devices having functions for controlling the switchgear and indicating a status of the switchgear including failure status thereof; and a rear accommodating box disposed on the back of the DC circuit breaker accommodating box, which accommodates a device for monitoring a status of the main circuit and protecting the main circuit; wherein the front accommodating box and the rear accommodating box are connected to the DC circuit breaker accommodating box to form an integrated DC switchgear.

According to the present invention, it is possible to provide a DC switchgear provided with a commutating DC circuit breaker for which labor hours and time taken to design and manufacture a DC switchgear suitable for various applications and specifications can be reduced by standardizing the design of a DC circuit breaker accommodating box.

DETAILED DESCRIPTION OF THE PREFERRED EMBODIMENTS

A DC switchgear having a commutation-type DC circuit breaker of embodiment of the present invention will be described with reference to the drawings.

First Embodiment

Figure 3:
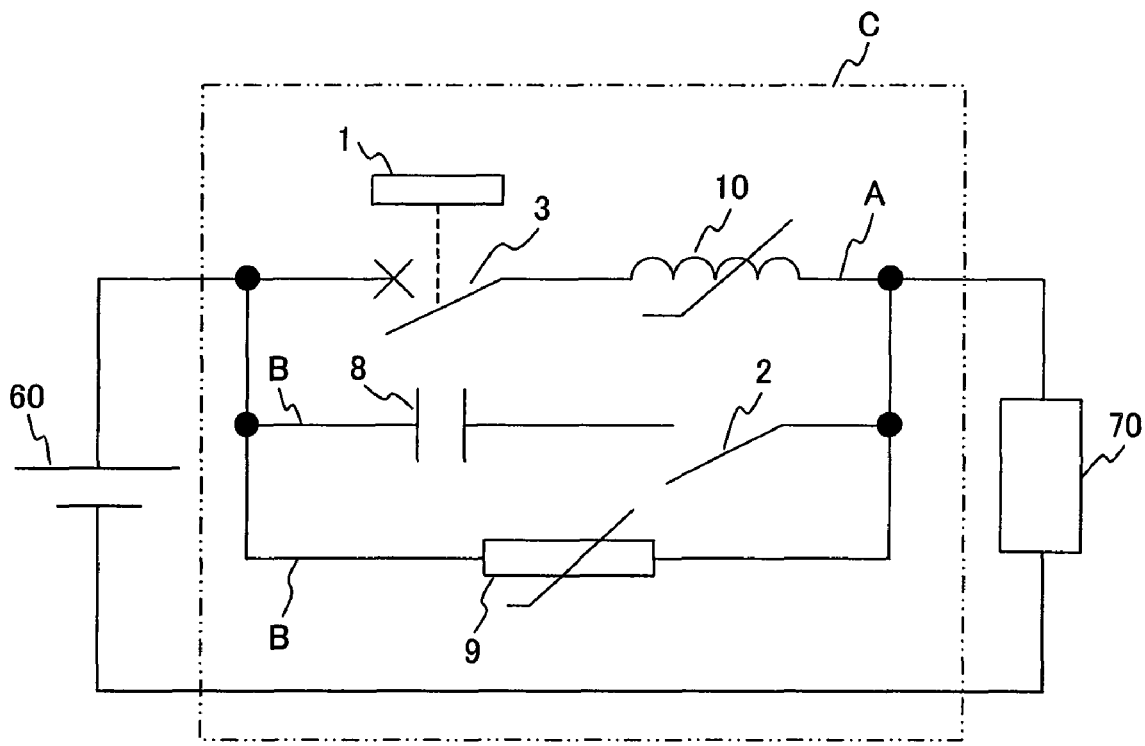
FIG. 3 is a schematic circuit of a DC circuit breaker having a commutation-type DC circuit breaker C of the embodiment shown in FIG. 1 and FIG. 2.

FIG. 3 is a schematic circuit of a DC circuit breaker having a commutation-type DC circuit breaker C.

In FIG. 3, a main circuit A provided with a main switch 3 and a saturable reactor 10 which are comprised of a commutation-type DC circuit breaker C is interconnected with a DC power source 60 and a load 70. The commutation-type DC circuit breaker C is provided with a commutating circuit B which is connected to the main circuit A having the main switch 3.

The commutating circuits B are electrically disposed parallel to the main switch 3 in the main circuit A, and a commutating capacitor 8 and a commutating switch 2 are interconnected in series in the one of the commutating circuit B. Also, a non-linear resistor 9 disposed in the another commutating circuit B is electrically disposed in parallel to the main switch 3 in the main circuit A The non-linear resistor 9 in the another commutating circuit B acts for absorbing an electromagnetic energy of the main circuit A.

Figure 1:
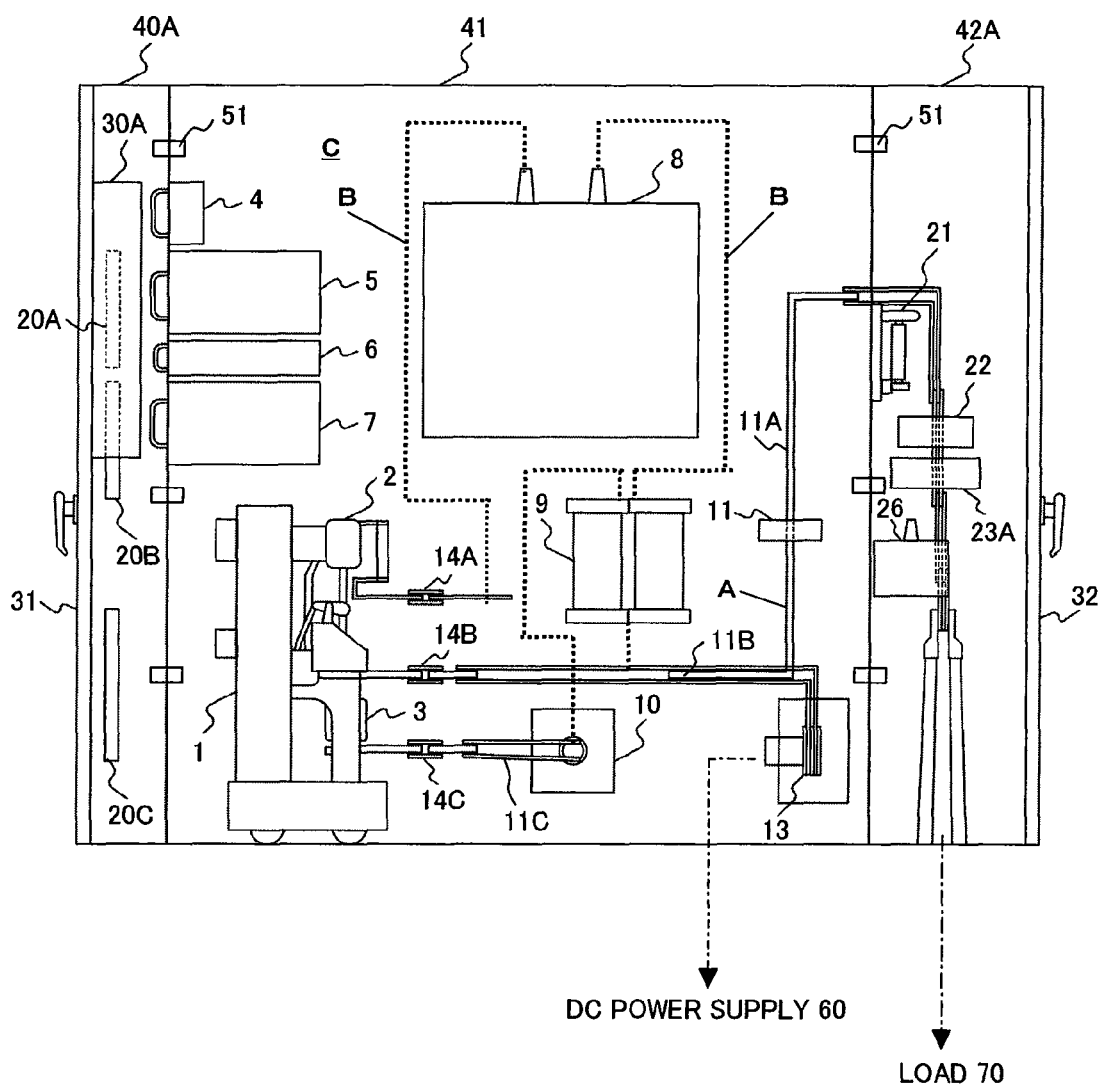
FIG. 1 is a schematic cross sectional view to show the structure of a DC switchgear having a commutation-type DC circuit breaker of an embodiment of the present invention.

FIG. 1 is a schematic cross sectional view of a DC switchgear having a commutation-type DC circuit breaker of an embodiment of the present invention.

The DC switchgear having a commutation-type DC circuit breaker C in FIG. 1 is structured by connecting a main circuit A including a main switch 3 and a saturable reactor 10 that interconnects a DC power source 60 and a load 70 and turns on and off a current flowing in the main circuit A, and a commutating circuit B including a commutating capacitor 8, a commutating switch 2 and a non-linear resistor 9 electrically disposed parallel to the main switch 3. The commutating capacitor 8 and the commutating switch 2 are interconnected in series in the commutating circuit B. The non-linear resistor 9 in the commutating circuit B is connected in parallel to the main circuit A.

The main devices being structured the DC switchgear are accommodated separately in a DC circuit breaker accommodating box 41, a front accommodating box 40A disposed on the front of the DC circuit breaker accommodating box 41, and a rear accommodating box 42A disposed on the back of the DC circuit breaker accommodating box 41.

Main standardized devices being structured the commutation-type DC circuit breaker C are accommodated in the DC circuit breaker accommodating box 41.

Specifically, the DC circuit breaker accommodating box 41 internally includes, at the bottom of the front, a main switch driving device 1 which provides with the main switch 3 for extinguishing arc for the current flowing in the main circuit A and the commutating switch 2 for passing a current to be superimposed on the current flowing in the main circuit A. The main switch driving device 1 drives the main switch 3 for generating a current zero from the superimposed current to shut off the current to the main circuit A.

The DC circuit breaker accommodating box 41 further internally includes, behind the main switch driving device 1, a non-linear resistor 9 provided in the commutating circuit B for absorbing energy and a saturable reactor 10 for reducing a current change ratio around the current zero in the main circuit A.

The DC circuit breaker accommodating box 41 internally includes, above the non-linear resistor 9 and saturable reactor 10, a commutating capacitor 8 for supplying a commutating current to the main switch 3; control devices 4 to 7 for controlling and operating individual devices disposed in the DC circuit breaker accommodating box 41 are provided in front of the commutating capacitor 8.

The DC circuit breaker accommodating box 41 internally includes, at the bottom of the back, a bus bar 13 connected to an external DC power supply 60; connection conductors 11A, 11B, and 11C provided in other spaces in the DC circuit breaker accommodating box 41 are connected to the bus bar 13.

The main switch 3 and commutating switch 2 disposed in the DC circuit breaker accommodating box 41 are respectively electrically connected to the individual devices, bus bar 13, and connection conductors 11A, 11B, and 11C through isolating points 14A to 14C; an overcurrent detection relay 11 for detecting an overcurrent is attached to the connection conductor 11A through which the main circuit current flows.

The rear accommodating box 42A is disposed on the back (rear side) of the DC circuit breaker accommodating box 41; the rear accommodating box 42A is removably connected to the DC circuit breaker accommodating box 41 with connecting members 51 such as bolts and nuts.

The rear accommodating box 42A has a rear door 32 for opening and closing the rear accommodating box 42A; when the rear door 32 is opened, an operator can perform maintenance and inspection for a fuse disconnector 21, a protection relay 22 for circuit protection, a DC current transformer 23A for detecting the current in the main circuit, a rectifier box 25, a DC voltage transformer 26, and a main circuit on a load side, which are all disposed in the rear accommodating box 42A.

The main circuit on the load side of the rear accommodating box 42A is formed as a lower drawer.

The front accommodating box 40A is disposed in front (front side) of the DC circuit breaker accommodating box 41; the front accommodating box 40A is removably connected to the DC circuit breaker accommodating box 41 with connecting members 51 such as bolts and nuts.

The front accommodating box 40A has a front door 31 for opening and closing the front accommodating box 40A; when the front door 31 is opened and the main switch driving device 1 accommodated in the DC circuit breaker accommodating box 41 is drawn out from the inside of the DC circuit breaker accommodating box 41 toward the outside of the front accommodating box 40A, the main switch driving device 1 is separated from the isolating points 14A to 14C accommodated in the DC circuit breaker accommodating box 41, and thus the main switch 3, commutating switch 2, and the like of the accommodated devices can now be serviced for maintenance and inspected.

A control unit 30A for the switchgear is attached to the back of the front door 31 mounted on the front accommodating box 40A, the control unit 30A comprising an auxiliary relay and a control switch for the switchgear, lamps for status indication, a failure indicator, and the like. The front side of the front door 31 or the rear side of the control unit 30A for the switchgear has a switch, lamps, and a failure indicator.

Terminal blocks 20A to 20C at which electric cables are terminated are provided on an internal side surface of the front accommodating box 40A; the control unit 30A is electrically connected through the terminal blocks 20A to 20C to the individual devices constituting the DC switchgear that are disposed in the DC circuit breaker accommodating box 41 and rear accommodating box 42A.

As described above, the main devices accommodated in the DC circuit breaker accommodating box 41, which is part of the DC switchgear in this embodiment, take a standardized device arrangement. In a specific example of a standardized arrangement of the devices disposed in the DC circuit breaker accommodating box 41, the DC circuit breaker accommodating box 41 includes, as the device arrangement standardized for the DC circuit breaker accommodating box 41 in its inside: the main switch driving device 1, which is movable and has the main switch 3 and commutating switch 2, the non-linear resistor 9 and saturable reactor 10, which are disposed behind the main switch driving device 1, the commutating capacitor 8 disposed above the non-linear resistor 9, the control devices 4 to 7 disposed in front of the commutating capacitor 8, the bus bar 13 disposed at the bottom on the rear side inside of the DC circuit breaker accommodating box 41, the connection conductor 11B connected to the bus bar 13, the isolating points 14A to 14C connected to the main switch 3, the commutating switch 2, the bus bar 13, and the connection conductors 11A to 11C, and the overcurrent detection relay 11 attached to the connection conductor 11A, in which the main circuit current flows.

According to the DC switchgear including a commutation-type DC circuit breaker C in this embodiment, the devices which are accommodated in the DC circuit breaker accommodating box 41 are constructed in a standardized arrangement for the DC circuit breaker accommodating box 41 as described above, the devices accommodated in the DC circuit breaker accommodating box 41 can be used as the standardized arrangement regardless of the specifications and application of the product. And the devices disposed in the front accommodating box 40A and the rear accommodating box 42A mounted on the front and back of the DC circuit breaker accommodating box 41A, which constitute the DC switchgear are just making a change the types, structures, and arrangement thereof according to the specifications and application of the product. Consequently the devices accommodated in the DC circuit breaker accommodating box 41 having the above standardized device arrangement can be used without changing the arrangement thereof.

Accordingly, when a DC switchgear is designed and manufactured, changes can be made quickly and easily by just making a change of the devices disposed in the front accommodating box 40A and the rear accommodating box 42A according to the desired specifications and application, so that labor hours and time taken to design and manufacture the DC switchgear with a commutating DC circuit breaker suitable for various applications and specifications can be reduced.

That is, as described above, a DC circuit breaker accommodating box 41 having the standardized device arrangement can be standardized and manufactured.

Since it is also possible to concurrently manufacture the three accommodating boxes constituting the DC switchgear, that is, the front accommodating box 40A and rear accommodating box 42A that accommodate devices other than in the above standardized device arrangement and the DC circuit breaker accommodating box 41 having the above standardized device arrangement, the efficiency of designing and manufacturing the DC switchgear is increased.

Accordingly, labor hours and time taken to design and manufacture a DC switchgear can be reduced, and furthermore an inexpensive DC switchgear can be implemented.

When control power is supplied to the inside of the DC circuit breaker accommodating box 41, it becomes possible to shut off DC current only by a device accommodated in the DC circuit breaker accommodating box 41 when an overcurrent, back flow, or other failure is detected in the main circuit A.

Accordingly, when only the DC circuit breaker accommodating box 41 having the above standardized device arrangement is delivered to a customer and a separately manufactured or exiting front accommodating box 40A and rear accommodating box 42A are integrally connected to the DC circuit breaker accommodating box 41 to configure a DC switchgear, the resulting DC switchgear can function as a DC switchgear having a commutation-type DC circuit breaker C.

That is, when a DC circuit breaker accommodating box 41 with a standardized device arrangement is manufactured in a standard way, a various types of customers' demands not only for a newly-designed DC switchgear having a commutation-type DC circuit breaker C, but also for modification of DC switchgear having a commutation-type DC circuit breaker C can be flexibly met.

According to this embodiment of the present invention, it is possible to provide a DC switchgear having a commutation-type DC circuit breaker for which labor hours and time taken to design and manufacture a DC switchgear suitable for various applications and specifications can be reduced by standardizing the design of a DC circuit breaker accommodating box.

Second Embodiment

Figure 2:
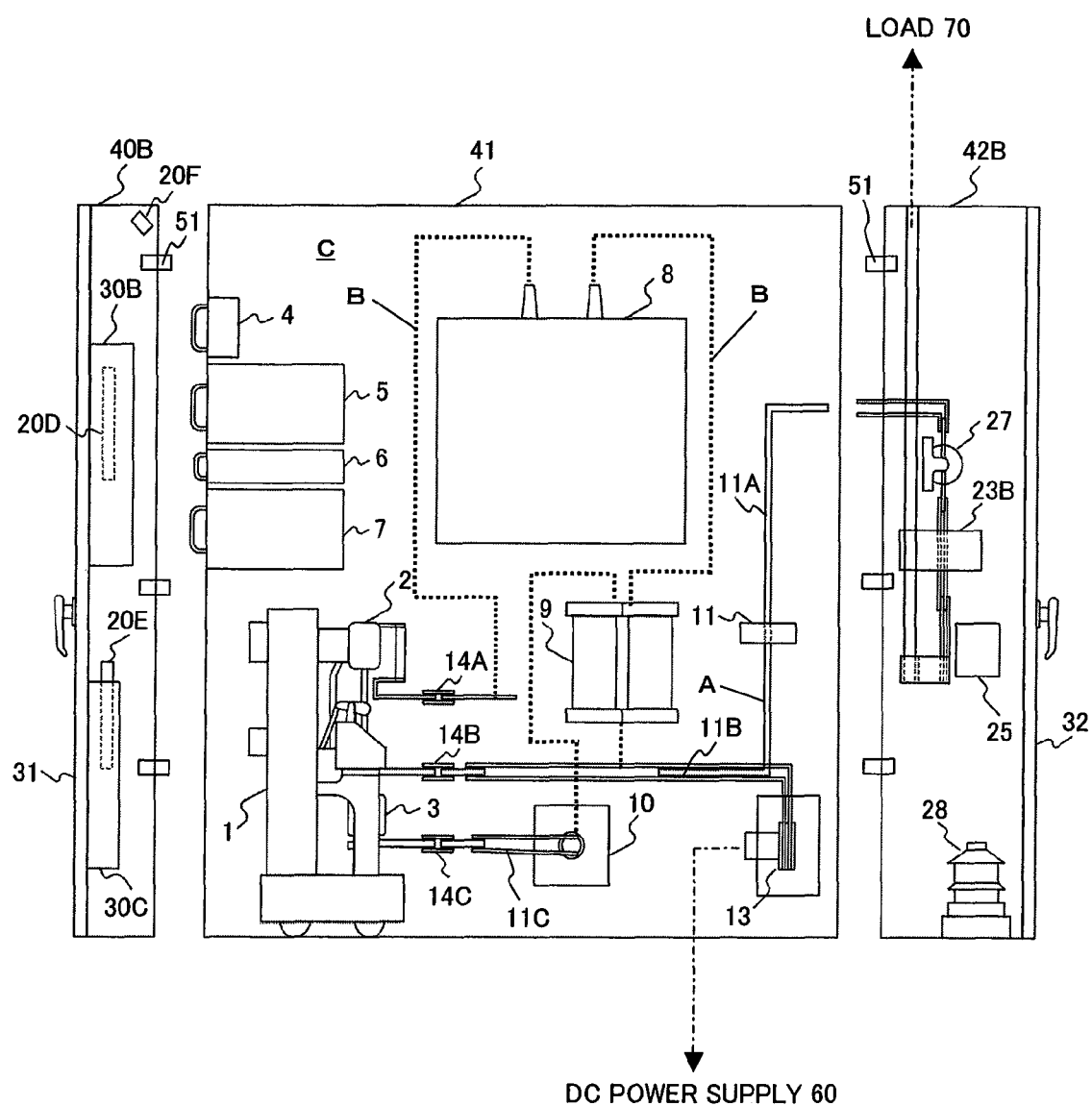
FIG. 2 is a schematic cross sectional view to show the structure of a DC switchgear having a commutation-type DC circuit breaker of another embodiment of the present invention.

FIG. 2 is a schematic cross sectional view of a DC switchgear having a commutation-type DC circuit breaker of another embodiment of the present invention.

The DC switchgear in this embodiment and the DC switchgear, shown in FIG. 1, in the previous embodiment have a common basic part in their arrangements, so explanation of the common arrangement will be omitted and only different arrangements will be described.

When the arrangement of the DC switchgear having a commutation-type DC circuit breaker, shown in FIG. 2, in this embodiment is compared with the arrangement in the previous embodiment shown in FIG. 1, there is no difference in the arrangement of the devices accommodated in the DC circuit breaker accommodating box 41, which has a standardized device arrangement, because standardized devices are placed. However, the device arrangement of the devices disposed in the rear accommodating box 42B differs from the device arrangement, shown in FIG. 1, in the previous embodiment in that a disconnector 27, a DC current transformer 23B, a rectifier box 25, a DC arrestor 28, and a main circuit A on the load side 70 are provided. Furthermore, the main circuit A on the load side 70 is changed to an upper drawer.

The devices accommodated in the front accommodating box 40B also differs from the arrangement, shown in FIG. 1, in the previous arrangement; control units 30B and 30C for the switchgear are attached to the back of the front door 31, the control units 30B and 30C each comprising an auxiliary relay and control switch for the switchgear, lamps for status indication, a failure indicator, and the like. The front side of the front door 31 or the rear side of the control unit 30B or 30C has a switch, lamps, and a failure indicator.

Terminal blocks 20D to 20F at which electric cables are terminated are provided on an internal side surface of the front accommodating box 40B; the control unit 30B is electrically connected through the terminal blocks 20D to 20F to the individual devices constituting the DC switchgear that are disposed in the DC circuit breaker accommodating box 41 and rear accommodating box 42B.

As in the embodiment in FIG. 1, the main devices accommodated in the DC circuit breaker accommodating box 41, which is part of the DC switchgear in this embodiment, take a standardized device arrangement. In a specific example of a standardized arrangement of the devices disposed in the DC circuit breaker accommodating box 41, the DC circuit breaker accommodating box 41 includes, as the device arrangement standardized for the DC circuit breaker accommodating box 41 in its inside: the main switch driving device 1, which is movable and has the main switch 3 and commutating switch 2, the non-linear resistor 9 and the saturable reactor 10, which are disposed behind the main switch driving device 1, the commutating capacitor 8 disposed above the non-linear resistor 9, the control devices 4 to 7 disposed in front of the commutating capacitor 8, the bus bar 13 disposed at the bottom on the rear side inside of the DC circuit breaker accommodating box 41, the connection conductor 11B connected to the bus bar 13, the isolating points 14A to 14C connected to the main switch 3, the commutating switch 2, the bus bar 13, and the connection conductors 11A to 11C, and the overcurrent detection relay 11 attached to the connection conductor 11A, in which the main circuit current flows.

As is understood from the above explanation, there is a difference in part of the product specifications between the DC switchgear, shown in FIG. 2, in this embodiment and the DC switchgear, shown in FIG. 1, in the previous embedment.

The front accommodating box 40B and rear accommodating box 42B respectively disposed on the front and back of the DC circuit breaker accommodating box 41 having the standard device arrangement are removably connected to the DC circuit breaker accommodating box 41 having the standard device arrangement with connecting members 51 such as bolts and nuts, making it possible to attach them to the DC circuit breaker accommodating box 41 and remove them from the DC circuit breaker accommodating box 41.

FIG. 2 shows a state in which the front accommodating box 40B and rear accommodating box 42B are separated from the DC circuit breaker accommodating box 41, the arrangement of the devices in which is standardized.

As described above, a structure is employed that enables the front accommodating box 40B and rear accommodating box 42B to be attached to the DC circuit breaker accommodating box 41, the arrangement of the devices in which is standardized, and removed from the DC circuit breaker accommodating box 41, so even when the specifications of the DC switchgear are changed after a product is delivered to a customer, the DC circuit breaker accommodating box 41 having the standardized device arrangement in it can be still diverted and used.

In this embodiment as well, since the DC circuit breaker accommodating box 41 having the standard device arrangement in it can continue to be used, so it is also possible to concurrently manufacture the three accommodating boxes constituting the DC switchgear, that is, the front accommodating box 40B and rear accommodating box 42B that accommodates devices other than in the above standardized device arrangement and the DC circuit breaker accommodating box 41 having the above standardized device arrangement, the efficiency of operations for designing and manufacturing the DC switchgear is increased.

Accordingly, labor hours and time taken to design and manufacture a DC switchgear can be reduced, and furthermore an inexpensive DC switchgear can be implemented.

According to this embodiment of the present invention, it is possible to provide a DC switchgear having a commutation-type DC circuit breaker for which labor hours and time taken to design and manufacture a DC switchgear suitable for various applications and specifications can be reduced by standardizing the design of a DC circuit breaker accommodating box.

The present invention can be applied to a DC switchgear and, more particularly, to a DC switchgear including a commutation-type DC circuit breaker.

What is claimed is:

1. A DC switchgear provided with a commutation-type DC circuit breaker having a main circuit provided with a main switch for interconnecting a DC power supply and a load and for enabling and disabling a main circuit current flow, and a commutating circuit provided with a commutating capacitor and a commutating switch, which is connected electrically parallel to the main switch, comprising:

a DC circuit breaker accommodating box which includes, as a standard arrangement, the main circuit provided with the main switch, and the commutation-type DC circuit breaker having the commutating circuit provided with the commutating capacitor and the commutating switch, which are connected electrically parallel to the main switch;

a front accommodating box disposed on the front of the DC circuit breaker accommodating box, which accommodates devices having functions for controlling the switchgear and indicating a status of the switchgear including a failure status thereof; and a rear accommodating box disposed on the back of the DC circuit breaker accommodating box, which accommodates a device for monitoring a status of the main circuit and protecting the main circuit; wherein the front accommodating box and the rear accommodating box are removably connected to the DC circuit breaker accommodating box, and the front accommodating box and the rear accommodating box are connected to the DC circuit breaker accommodating box to form an integrated DC switchgear.

2. A DC switchgear provided with a commutation-type DC circuit breaker having a main circuit provided with a main switch for interconnecting a DC power supply and a load and for enabling and disabling a main circuit current flow, and a commutating circuit provided with a commutating capacitor and a commutating switch, which is connected electrically parallel to the main switch, comprising:
- a DC circuit breaker accommodating box which includes, as a standard device arrangement, a movable main switch driving device having the main switch and the commuting switch, a non-linear resistor and a saturable reactor disposed behind the main switch driving device, the commutating capacitor disposed above the non-linear resistor, control devices for controlling and operating disposed devices, a bus bar and a connection conductor connected to the bus bar, an isolating point linked to the main switch, the commutating switch, the bus bar, and the connection conductor, and an overcurrent detection relay attached to the connection conductor flowing a main circuit current;
- a front accommodating box disposed on the front of the DC circuit breaker accommodating box, which accommodates devices having functions for controlling the switchgear and indicating a status of the switchgear including failure status thereof; and
- a rear accommodating box disposed on the back of the DC circuit breaker accommodating box, which accommodates a device for monitoring a status of the main circuit and protecting the main circuit; wherein the front accommodating box and the rear accommodating box are removably connected to the DC circuit breaker accommodating box, and the front accommodating box and the rear accommodating box are connected to the DC circuit breaker accommodating box to form an integrated DC switchgear.

* * * * *